United States Patent [19]
Hatch et al.

[11] 3,849,587
[45] Nov. 19, 1974

[54] COOLING DEVICES FOR PROTECTING REFRACTORY LININGS OF FURNACES

[75] Inventors: Gerald Gordon Hatch, Toronto; Bert Orland Wasmund, West Hill, both of Canada

[73] Assignee: Hatch Associates Limited, Toronto, Ontario, Canada

[22] Filed: Dec. 13, 1973

[21] Appl. No.: 424,564

[30] Foreign Application Priority Data
Oct. 15, 1973 Canada .............................. 183399

[52] U.S. Cl. ......................................... 13/32, 13/35
[51] Int. Cl. ........................... F27b 3/24, F27d 1/12
[58] Field of Search ................. 13/32, 35; 432/233; 165/134, 136, 169; 266/32

[56] References Cited
UNITED STATES PATENTS
3,692,103  9/1972  Andoniev et al. ................. 165/169
3,743,752  7/1973  Furuhashi .......................... 13/35 X

*Primary Examiner*—R. N. Envall, Jr.
*Attorney, Agent, or Firm*—Ridout & Maybee

[57] ABSTRACT

Erosion and penetration of refractory linings in high temperature furnaces are prevented by placing through the furnace walls and into the linings solid cooling members of high thermal conductivity. The length, cross-sectional area, spacing and material of the solid members are selected so as to avoid melting thereof and to conduct sufficient heat from the lining to limit erosion of the lining and, in applications in which molten process materials are in contact with the refractory lining, to maintain some thickness of refractory or frozen process material between the ends of the cooling members and the bath of molten process material.

19 Claims, 9 Drawing Figures

3,849,587

COOLING DEVICES FOR PROTECTING REFRACTORY LININGS OF FURNACES

BACKGROUND OF THE INVENTION

Erosion of the refractory lining in vessels operating at high temperatures is a significant cost factor in many chemical and metallurgical plants. There are several mechanisms by which the refractory can be attacked, i.e., simple melting, chemical dissolution by hot melts or slags, chemical reactions in the refractory which decreases its refractoriness, spalling due to thermal cycling and mechanical erosion by impaction of liquid or solid particles. Several of these mechanisms may occur simultaneously and often the attack is localized in specific wear areas in the vessel. Irrespective of the erosion mechanisms, the severity of the attack accelerates with increased temperature at the hot face of the refractory. A few examples of refractory attack are: undercutting of the sidewalls in the arc flare zones in electric steel melting furnaces, erosion of the linings of iron blast furnaces, BOF vessels and other steelmaking vessels, erosion and melting of furnace roofs, erosion of the refractories around gas off-takes in furnaces and roasters, and local refractory attack around the slag and metal tapholes of furnaces.

Another problem which is commonly encountered with refractory linings containing liquid baths of mattes, metals and fused salts at temperatures well above their freezing point is penetration of the melt into cracks in the lining. Alternate melting and freezing of the penetrated material enlarges the cracks and eventually run-outs through the lining occur. Although refractory erosion may be minimal in these cases, the lining fails because a substantial part of its thickness is operating at temperatures well above the freezing point of the contained melt.

Under steady operating conditions, the temperature at the hot face of a lining is dictated by the heat flux input from the process to the wall, the thickness and thermal conductivity of the wall lining and the temperature at the cold face of the wall. The following equations illustrate the inter-relationship of these variables:

$$Q/A = h (T_p - T_{hf}) = K (T_{hf} - T_{cf})/t$$

or $$T_{hf} = h T_p + (k/t) \cdot T_{cf} / h + (k/t)$$

where:
$Q/A$ = heat flux input to the wall from the process
$h$ = the heat transfer coefficient between the process medium and the hot face of the wall
$K$ = the thermal conductivity of the wall lining
$t$ = thickness of the wall lining
$T_p$ = temperature of the process medium
$T_{hf}$ = temperature at the hot face of the wall lining
$T_{cf}$ = temperature of the cold face of the wall lining Normally the values of $h$ and $T_p$ are fixed by the processes occurring in the vessel. The temperature at the outside cold face of the wall lining is dependent on the type of cooling obtaining there, natural air cooling, forced air cooling and water cooling being alternate methods.

Where a refractory lining is holding a molten, corrosive slag and the heat flux input from the slag to the lining imposes a hot-face temperature which exceeds the freezing point of the slag, then the slag will erode the refractory lining until it is thin enough to conduct the required heat flux at a hot-face temperature which is equal to the slag-freezing point. At this point a frozen layer of slag is formed on the refractory which protects it from further erosion. Similarly, where a refractory roof or sidewall lining receives excessive heat flux from an arc, a flame or a steam of hot gas, such that the refractory hot face is above the temperature at which melting or erosion of the refractories occurs, then the refractory is eroded until it reaches a thickness at which the heat can be conducted through it by a hot-face temperature which is below the temperature at which erosion can occur.

Where refractory erosion is severe, it is common practice to shut the vessel down for repair when the lining has become badly eroded. In some applications the lining life can be extended by temporary hot patching of the eroded areas. In the majority of cases, the use of water-cooled breast plates attached onto the outside surface of the wall does not effect sufficient extra cooling to substantially correct the erosion.

One method which has been used to obviate refractory erosion is the installation of water-cooled steel boxes or copper castings that penetrate the lining either to the hot face of the refractory or close to it. These coolers serve to remove the heat input to the lining and thereby keep the surrounding refractory cool. An example of this type of cooler is the water-cooled castings inserted into the walls of iron blast furnaces. Although this approach effectively combats refractory erosion, extremely hazardous conditions arise when the coolers develop leaks which allow water to run into the hot vessel. Explosions have occurred which resulted in the destruction of the vessel and loss of life. Due to this serious impediment, internal water cooling of refactory linings is not a safe method for protecting refractories in many applications. Examples of this type of water cooling of refractory linings are found in U.S. Pat. Nos. 1,703,519; 3,593,975; 3,598,382 and 3,679,194.

It has now been discovered that refractory linings of high temperature furnaces can be safely and effectively cooled and protected from attack by using a suitable arrangement of solid cooling members of high thermal conductivity.

It is an object of the present invention to provide a means for controlling the erosion of and penetration of molten materials into the refractory linings of furnaces operating at high temperatures.

Other objects and advantages of the invention will be apparent from the description following taken in conjunction with the accompanying drawing.

SUMMARY

Refractory linings of furnaces operating at high temperatures are protected in the present invention by placing solid cooling members of high thermal conductivity through the wall of a furnace and into the lining, the outer portions of the coolers remaining outside of the refractory lining. The cooling members embedded in the lining are substantially devoid of water cooled channels in the portions thereof located inside the lining of the furnace and the length, cross-sectional area, spacing and material of the cooling members are selected to avoid melting thereof and to conduct sufficient heat from the lining to limit erosion of the lining and, in applications in which molten process materials are in contact with the lining, to maintain some thickness of refractory or frozen process material between the hot ends of the cooling members and the bath of molten process material.

DESCRIPTION OF THE PREFERRED EMBODIMENTS

The invention is most useful for controlling the erosion of refractory linings or the penetration of molten materials into refractory linings. Heat is extracted from the hot face of the lining by the solid members of high thermal conductivity which are inserted into the lining. The solid coolers of high thermal conductivity, which may be, for example pure copper, can conduct such large heat fluxes that the need of substantial water cooling inside the lining is obviated, thereby eliminating the serious risks of leaks and explosions inherent with coolers employing internal water cooling.

The length of the solid coolers is selected to maintain the desired lining thickness and the spacing and cross-sectional area of the coolers are designed, based on the thermal conductivity and melting point of the cooler material, so that the coolers will not melt and so that they conduct sufficient heat through the wall to limit refractory erosion and, in the case where molten process material is in contact with the lining, to maintain some thickness of refractory or frozen process material between the hot ends of the coolers and the bath of molten process material. Where penetration of molten material into the lining is a problem, the length, spacing and cross-sectional area of the solid coolers are selected to conduct sufficient heat from the wall to maintain the boundary between frozen and molten process materials a desired distance from the outside of the wall.

Figure 1:
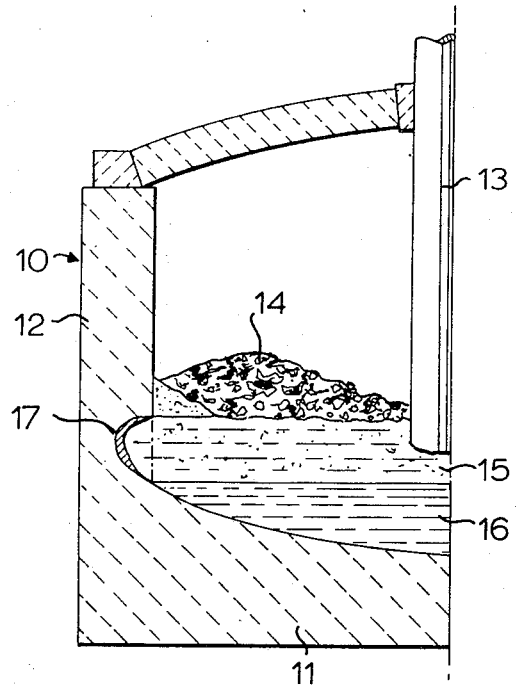
FIG. 1 is a partial sectional view in elevation of an electric smelting furnace which is not utilizing the invention.
Figure 2:
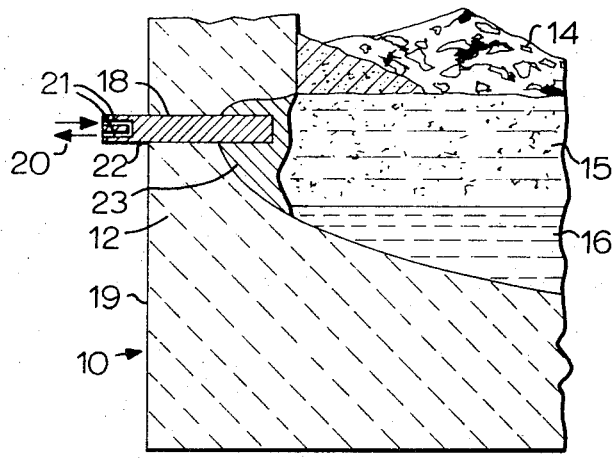
FIG. 2 is a view of the same furnace as shown in FIG. 1 but utilizing an embodiment of the invention.
Figure 3:
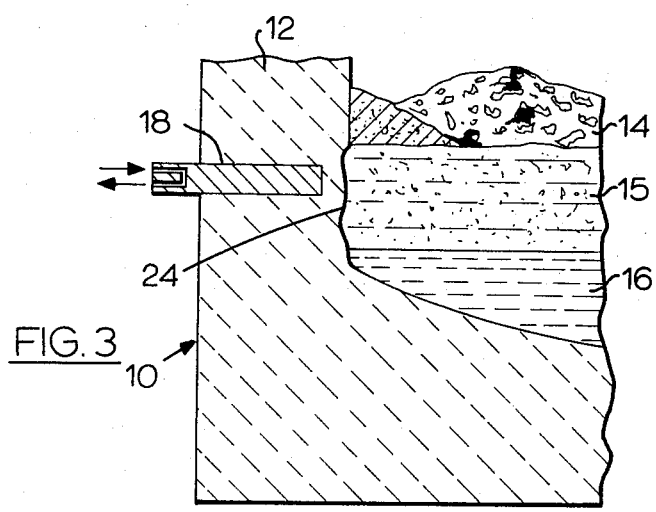
FIG. 3 is a similar view to FIG. 2 but showing an embodiment of the invention used somewhat differently.

The solid coolers are simple to fabricate and install and a variety of shapes can be used, depending on the specific application. The ends of the coolers outside the refractory lining may be cooled by natural convection and radiation from either plane or finned surfaces, by forced-air cooling or by water-cooling, depending on the application. If water-cooling is used, then the water cooled channels are restricted substantially to the end of the cooler protruding outside the lining so that there is no danger of water running into the hot vessel and causing explosions. In this aspect, the solid coolers proposed herein differ from the other types of internal coolers used heretofore which all carried the water cooled channels well into the refractory lining. The invention can readily be described with reference to FIGS. 1, 2 and 3 of the drawings. FIG. 1 is a partial transverse view through an electric smelting furnace 10 having a refractory lined hearth 11 and sidewall refractory lining 12. The heat required for smelting is put into the furnace in the form of electrical energy entering through electrode 13. Charge material 14, when smelted, collects in the furnace in layers of molten slag 15 and metal or matte 16. The hot molten slag 15, which receives the electrical energy from the electrode 13, contains chemical species which react readily with the refractory. As a result, the lining of the sidewall 12 in contact with the molten slag 15 is rapidly eroded. Erosion will continue until the residual lining thickness can conduct the heat input from the slag bath and maintain a thin layer of frozen slag 17 between the molten slag 15 and the refractory 12 as in FIG. 1. Commonly, the residual refractory thickness is too thin to provide a competent furnace lining and the furnace has to be shut down for refractory repair or the installation of a new lining.

The application of an embodiment of the present invention to the eroded sidewall 12 of the furnace 10 described above is shown in FIG. 2. Rods of high purity copper 18 (only one being shown) are installed into holes drilled in the refractory from the outside 19 of the furnace wall. Cooling water 20 flows through channels 21 drilled into ends 22 of the rods 18 which extend essentially outside of the furnace wall. With the appropriate selection of the length, spacing and cross-sectional area of the copper rods, sufficient heat conduction through the rods can be obtained to freeze a substantial body of frozen slag 23 around the rods 18 and between the rods and the molten slag bath 15. Despite the fact that the melting point of copper is substantially less than the temperature of the molten slag, the high-thermal conductivity of the copper ensures the formation of a frozen slag layer around the rod, which protects it from damage. Since the cooling water is applied remote from the furnace, with the solid cooling rods or members 18 being substantially devoid of any water cooled passages in the portions thereof contained within the refractory lining 12, the risk of getting water into refractory wall or the furnace is eliminated. Thus, the solid copper rods provide a safe means of restoring and maintaining a competent sidewall lining for the furnace.

Although the cooling members of the invention are substantially devoid of water cooled channels inside the refractory lining it can be appreciated that in certain instances channels can extend 1 to 2 inches inside the lining without any substantial risk and description herein of the cooling members being substantially devoid of water cooled channels is not meant to exclude such unsubstantial extension of the channels inside the refractory lining. The essence of the invention, then, is the presence in the refractory lining of solid cooling members of high conductivity which avoid any substantial use of water cooled channels which extend inside the lining.

Placement of the solid cooling members in a new sidewall lining 12 in the furnace 10 is illustrated in FIG.

3. In this case, serious erosion of section 24 of the refractory lining has been prevented by the use of the coolers 18.

Figure 4:
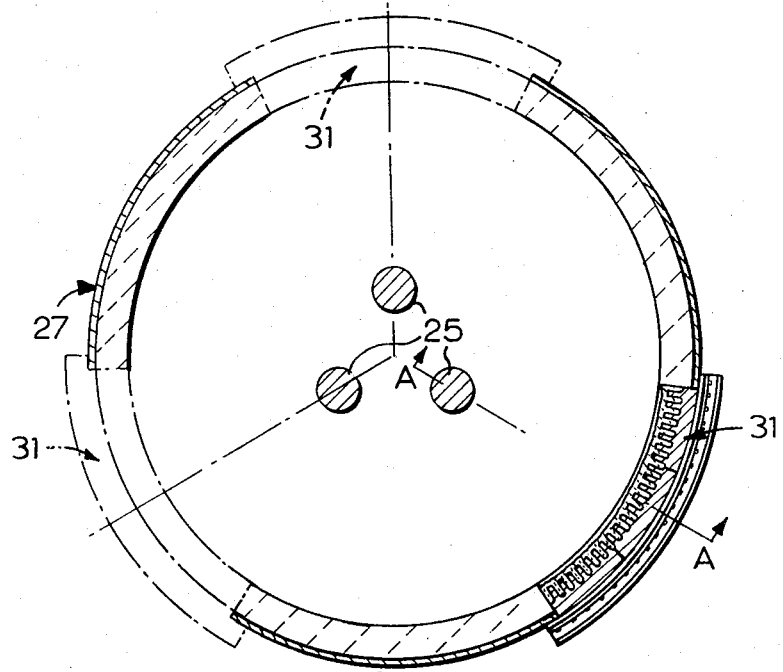
FIG. 4 is a sectional plan view of an electric steel furnace using an embodiment of the invention for cooling the sidewall lining in the arc flare zones.
Figure 4A:
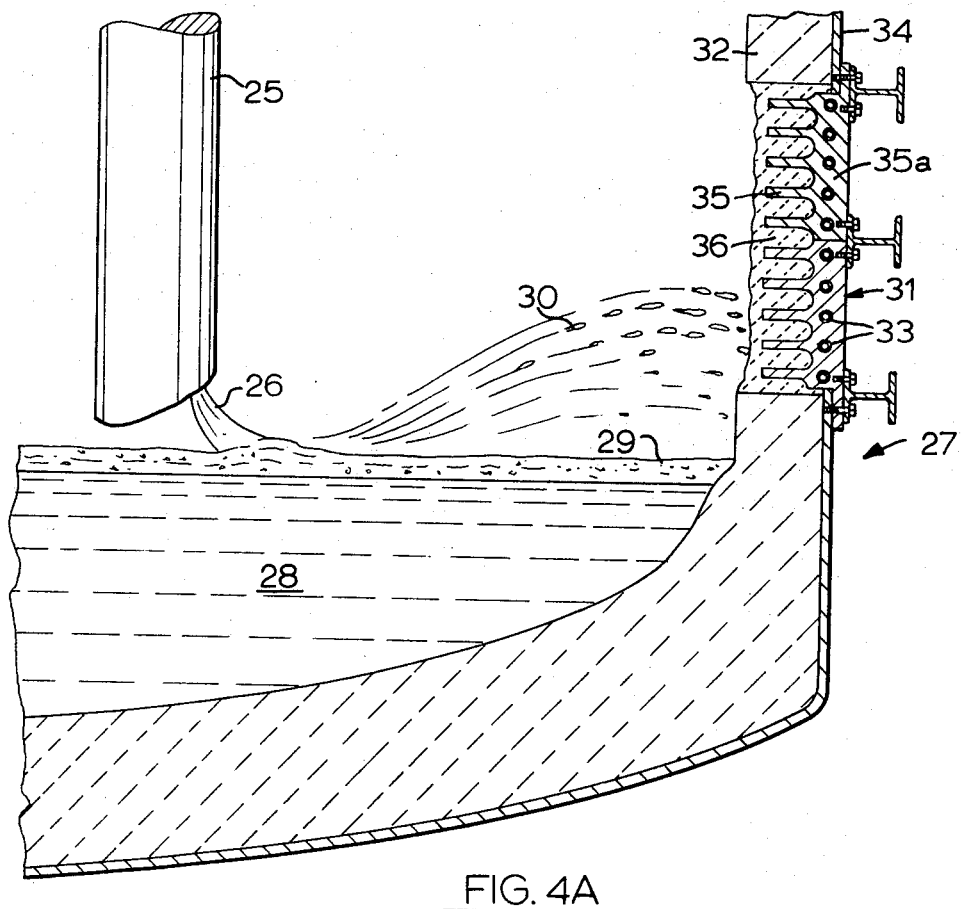
FIG. 4A is a partial elevational view taken through line A—A of FIG. 4.

The solid coolers of the invention can be used effectively in protecting the sidewalls of an electric steel furnace from local attack caused by the arc flares illustrated in FIG. 4A, which is a partial section through line A—A of FIG. 4, which shows a plan view in section of an electric arc furnace 27. In electric steel furnaces arcs 26, which are created between electrodes 25 and steel bath 28, are forced radially outward from the electrode tips and when the arcs 26 strike the bath of slag 29 and of the metal 28 flames 30 of hot gases and molten particles of slag and steel are created which impinge on the furnaces sidewalls above the bath level. The impact of the high-velocity, molten particles on the sidewall, combined with the intense heat radiation from the arcs 26, creates local areas of severe refractory attack. Although the eroded areas are gunned with refractory after each heat of steel, the entire sidewall lining must be replaced after about 100 heats of steel (about 2 weeks' operation). Steel producers in Japan have minimized the gunning frequency and prolonged the life of the sidewalls considerably by inserting water-cooled boxes into the lining in the arc-flare zones of the furnace. While this approach minimizes refractory attack, it also creates hazardous operating conditions because the likelihood of water leaks into the molten bath developing is high due to the mechanical and thermal abuse the water boxes must withstand.

The solid coolers of the present invention can be applied to the protection of the lining in the arc-flare zones without creating the hazards of explosions from water leaks. Because the areas requiring protection are relatively large and the heat flux is intense, a large number of coolers are required. In the embodiment shown in FIG. 4, castings of high-purity copper 31 are installed into sidewall lining 32 to cover the arc flare zones. Each casting consists of 40 to 50 individual solid coolers 35 integrally cast onto a continuous backing plate 35a. Water cooled channels 33 formed by casting pipe into the backing plate 35a remove the heat conducted out of the lining by the solid coolers 35. Each of the three arc flare zones in the furnace can be protected by six to nine of these castings which are secured with bolts to the furnace shell 34 and supporting steelwork. Castable refractory 36 is rammed in between and in front of the coolers 35 to form the furnace lining. The length of the coolers 35 inside the backing plate 35a can advantageously be about 9 inches and the coolers may be either circular or rectangular in cross-section. With the proper selection of the number, cross-sectional area and spacing of the coolers sufficient heat is conducted out of the lining to ensure the retention of a layer of refractory or frozen slag in front of the hot tips of the coolers. The surface of the coolers can be grooved to aid in locking the castable refractory in place. Other areas of the steel furnace sidewall lining subject to refractory attack can be protected using the integrally cast coolers described hereinbefore or individual cooling members can be used, e.g., around the slag line and below the roof ring.

Figure 5:
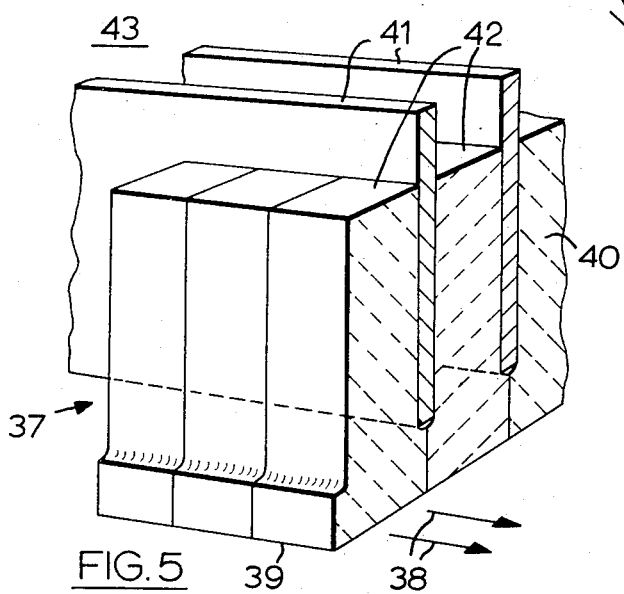
FIG. 5 is a perspective view of another embodiment of the invention.

Refractory walls and roofs subject to intense heat input from arcs, flames or hot gas streams can be protected using solid coolers, as illustrated in FIG. 5 which is a perspective view of a portion of roof 37 of a high temperature furnace. The heat flux received from the hot gas stream 38 is conducted from the hot face 39 of refractory lining 40 by solid plates 41, constructed of a suitable material of high thermal conductivity, which are inserted between the individual bricks 42 of the lining 40. The plates 41 extend outside the lining 40, a sufficient distance to provide adequate heat dissipation by natural convection and radiation to the ambient surroundings 43. The thickness of the solid plates 41 and the depth of their penetration into the refractory 40 can be designed to withdraw sufficient heat to maintain the hot face of the refractory below the temperature at which erosion can occur.

The solid cooling members can be fabricated from a number of materials, the key requisites being: high thermal conductivity, high melting point, chemical inertness to the environment of the vessel, adequate mechanical strength, high radiation emissivity where natural cooling is used, and cost. High purity copper is the best choice for many applications. However, a partial list of other materials would include graphite, iron, stainless steel, molybdenum, titanium, aluminum and alloys or combinations thereof.

The shape, spacing and distribution of the solid coolers must be selected to suit the specific application. The length of penetration into the refractories is selected to maintain sufficient lining thickness to ensure structural stability of the lining. The cross-sectional shape can be varied to suit the refractory construction and the heat withdrawal required. For instance, where the refractory lining is constructed of standard brick shapes, coolers with the same cross-section as the bricks, or even multiples of the brick dimensions can be readily incorporated into the wall to form a tight-fitting construction. Where it is desired to install the coolers into a badly eroded wall without dismantling, then cylindrical coolers which can be fitted into holes drilled into the lining are advantageous.

The heat removal rate per unit of wall area increases with the cross-sectional area of the coolers and with decreased spacing, hence these two geometric variables must be designed so that the desired heat removal will occur. For instance, where it is desired to freeze slag onto the hot face of the lining, the heat removal rate must be large enough so as to maintain a layer of refractory or frozen slag between the ends of the solid coolers and the molten slag bath. In addition, the cooler spacing must be selected so that erosion of the refractory between the hot ends of the coolers is controlled. The degree of erosion between the coolers increases with increased spacing and decreased thermal conductivity of the refractory or frozen process material surrounding the coolers; hence a knowledge of the latter variable is necessary for selecting the spacing.

Consideration of the additional heat removal from the process is another factor which must be assessed in the application of the solid coolers. In many applications, in particular, those which involve erosion of refractories by molten slags, the heat loss rate through the lining is not increased significantly by the coolers inasmuch as the uncooled refractory lining will be eroded back to allow the heat input from the process to be conducted through it in any case. In these cases, the heat input from the process dictates the heat removal rate through the wall and the solid coolers provide a method of removing the heat through a thicker lining. If excessive cooler cross-sectional area is installed into the wall, a thicker frozen slag crust will form at the hot face to limit the heat removal rate. The economic factor of heat losses is more critical in the case of refractory erosion by radiation, flame impingement or hot-gas streams since there are generally no materials present in the gases to freeze onto the hot face and thus limit the heat flow. In this case, the heat removal rate required to keep the lining hot face below the erosion temperature should be known reasonably accurately to enable an economical cooler design. The same reasoning applies when the coolers are used to limit the penetration of highly fluid molten materials into cracks or void spaces in refractory linings, thereby maintaining the boundary between frozen and molten process material a desired distance from the outside of the furnace wall.

Figure 6:
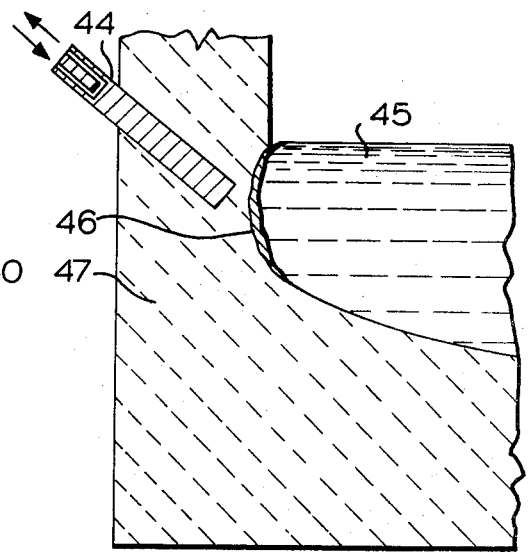
FIG. 6 is a sectional view in elevation of part of a furnace using a still further embodiment of the invention.

The solid coolers of the invention are used to best advantage where they are installed normal to the refractory lining since this represents the least distance to conduct the heat and hence gives the highest heat removal rate per unit of cooler cross-sectional area. However, there are specific applications in which slanted coolers can be used to advantage. For instance where it is desired to protect the refractories adjacent to the molten metal bath, there is a risk that if the metal should become overheated, it could melt the cooler and run out through the wall if the cooler channel is below the bath level. In this case, the desired cooling can be achieved without risk by slanting coolers 44 upwardly from metal bath 45, as illustrated in FIG. 6, thereby forming a frozen metal layer 46 between refractory wall 47 and the bath 45, as previously described. In the event that serious overheating of the metal bath occurs and the cooler melts, the molten metal cannot run out through the furnace wall since the opening in the furnace wall is above the metal level. Another application in which slanted coolers can be used to advantage is in the protection of refractories around openings in vessels where direct access to the opening outlet is required, e.g., furnace tapholes, charging ports, electrode openings and gas off-takes.

Figure 7:
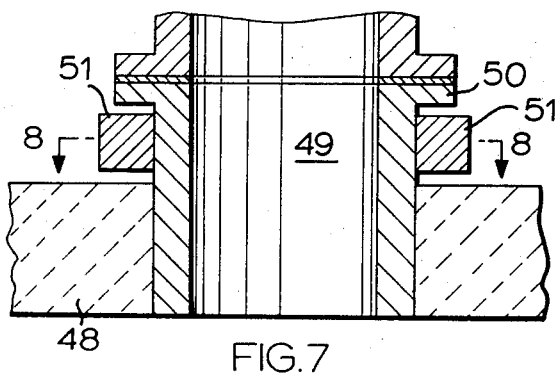
FIG. 7 is a sectional view of an embodiment of the invention used on a gas off-take from a furnace.
Figure 8:
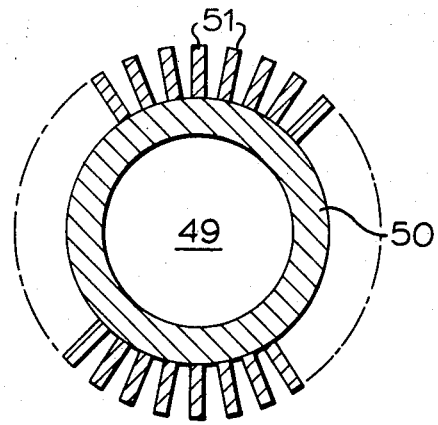
FIG. 8 is a view through line 8—8 of FIG. 7.

A further method of protecting the refractories around openings, which employs the principle of heat removal through a solid thermal conductor according to the invention, is illustrated in FIG. 7. In this application, refractory lining 48 around a hot-gas off-take 49 is protected from the off-gas stream by means of a solid copper frame 50 set into the wall. Heat received from the gas is conducted through a copper frame 50 from which it is dissipated to the surroundings by fins 51 located on the outer surface of the frame 50, as shown more clearly in FIG. 8 which is a plan view through line 8—8 of FIG. 7. Other openings in furnaces, such as feed ports can be protected in a similar fashion.

The heat removal rate of a solid cooler is dependent on the temperature drop across its length, hence the coolers are more effective when the end outside the lining is watercooled. However, in many applications, the cost and added complexity of a cooling-water support system can be obviated by allowing the exposed end to be cooled by natural convection and radiation to the ambient surroundings. In this case, the shape and dimensions of the exposed cooler end can be designed to enhance natural cooling, such as by the use of heat dissipation fins. If the exposed ends are water-cooled, they can, in many applications, be designed to dissipate sufficient heat by natural convection and radiation to prevent the hot end from melting in the event of supply failure. This fail-safe provision will prevent cooler damage in the event of a water failure, and it will allow shutting off the water for maintenance to the water lines, etc.

The solid coolers should be installed into the brickwork in such a manner as to obtain good thermal contact between the surfaces of the cooler and the surrounding refractories. This can be attained by either laying the refractory brickwork tightly against the sides of the cooler or, alternately, using a mortar of high-thermal conductivity, such as silicon carbide, to pack the space between the cooler and the refractories.

The invention is further illustrated by the following example.

The refractory sidewalls of a 45,000 kw., 6-electrodes-in-line electric furnace used to smelt prereduced lateritic nickel ore became severely eroded after operating about one year. The refractory sidewalls, which were originally 36 inches thick, had eroded down to a minimum of 7 inches thickness at some locations along the slag line, and were not more than 15 inches thick along most of the furnace length. This undercutting had caused the refractory walls above the slag line to become structurally unstable. Test drill holes showed that the refractory erosion was most severe at the surface of the slag bath and at a level of 15 – 18 inches above and below the slag surface erosion was negligible, the undercut profile being nearly parabolic in shape. The slag, which was tapped from the furnace at 2,950°–3,000°F. had a melting point of about 2,850°F. Heat loss calculations based on measured temperatures in the undercut refractory and the steel shell showed that the heat conduction through the 3 foot high undercut section of the sidewall was in the range of 9,000 to 12,000 BTU/hour per foot of wall length. Analytical and analogue thermal calculations indicated that if a single row of 4 inch diameter × 28 inch long solid coolers made of high purity copper and provided with water-cooling on the outside end were installed on 9 inch centres at the level of the slag bath surface and penetrating 18 inches into the lining they would conduct sufficient heat from the slag bath to freeze slag onto the undercut lining to provide at least 20 inches total lining thickness. Furthermore, it was estimated that the hot end of the solid copper coolers would not exceed 900°F and that the cooler would not melt if the cooling water was turned off. Following a period of 12 hours of power off the furnace to allow some cooling of the slag bath and furance lining, a diamond core drill equipped with compressed air cooling was used to cut the 4 ½ inch diameter × 18 inch deep holes into the sidewalls of the furnace. The 4 inch diameter solid copper coolers were installed into the holes, using silicon carbide castable to pack the annuli between the coolers and the holes. After a cooler was installed, its cooling water piping was installed and water flow through the cooler was commenced.

The following instrumentation was provided to assess the effectiveness of the coolers: (1) a number of the coolers were equipped with two thermocouples, one placed 2 inches from the hot end, the other placed 8 inches from the cold end, just past the ends of the water-cooling channels; (ii) three thermo-couples were installed into the sidewall on a vertical line mid-way between two coolers at elevations of the cooler centreline, 7 inches above the cooler centreline and 7 inches below the centre line and at penetrations of 18, 15 and 12 inches, respectively. Upon completion of the cooler installation, smelting was resumed at essentially full furnace power.

Observations over the first month of operation with the coolers yielded the following information:

i. The temperatures recorded at the hot ends of the copper coolers normally run at about 600°F., the highest value recorded being 900°F.

ii. The temperatures recorded at the cold ends of the coolers normally run at 125°F.

iii. The heat removal rate of the coolers varied with furnace conditions, the highest average rate being 7,800 BTU per hour per cooler, which corresponds to 10,400 BTU per hour, per foot of sidewall.

iv. The highest temperature recorded in the sidewall lining occurred at the thermocouple located 7 inches above the cooler centreline and it was 1,750°F.

v. The highest temperature recorded by the thermocouple located in the lining at the elevation of the cooler centrelines was 1,425°F.

vi. The highest temperature recorded by the thermocouple located in the lining 7 inches below the cooler centreline was 1,150°F.

The above measurements confirmed that the solid copper coolers were effective in freezing slag onto the previously undercut sidewalls. The maximum penetration of hot slag into the cooled sidewall occurred about 7 inches above the elevation of the coolers and here the estimated wall thickness was not less than 20 inches during the period.

The water was intentionally turned off from a cooler for a period of 24 hours to determine whether the cooler could dissipate sufficient heat from its exposed end by natural convection and radiation to survive. After 8 hours, the temperatures in the hot and cold ends of the cooler had stabilized at 960°F. and 700°F., respectively. After a period of 24 hours with the water off, the water flow was resumed without problems, and the temperatures at the hot and cold ends of the cooler quickly fell to 470°F. and 125°F. respectively. Although the heat input to the cooler was not at the highest level during this particular test, the results showed that there was no danger of burn-out, even at the highest anticipated heat removal rate. Thus, in this installation water-cooling at the cold ends of the coolers was not essential.

What we claim is:

1. A method for protecting the refractory lining of a furnace operating at high temperatures comprising placing solid cooling members of high thermal conductivity into the lining, the outer portions of the cooling members remaining outside of the refractory lining, said cooling members being substantially devoid of water cooled channels in the portions thereof located inside the lining, and selecting the length, cross-sectional area, spacing and material of said cooling members to avoid melting thereof and to result in withdrawal of sufficient heat from the furnace lining to limit erosion of the lining.

2. A method as claimed in claim 1 in which the solid cooling members are installed in the sidewall lining of a furnace near or below the surface of a bath of molten process material, and additionally comprising withdrawing sufficient heat through the solid coolers to maintain a thickness of solid material consisting of refractory lining material, frozen process material or mixtures thereof around the coolers and between the hot ends of the cooling members and the molten process material.

3. A method as claimed in claim 2 in which the molten process material is highly fluid with a tendency to penetrate cracks or void spaces in the lining, and maintaining the boundary between frozen and molten process material a desired distance from the outside of the furnace wall.

4. A method as claimed in claim 2 wherein the ends of the cooling members outside of the refractory lining are cooled by the circulation of water therein.

5. A method as claimed in claim 2 wherein the ends of the cooling members outside of the refractory lining are cooled by finned surfaces integral therewith.

6. A method as claimed in claim 1 wherein the cooling members are installed in an electric arc furnace at the arc flare zones of the furnace walls.

7. A method as claimed in claim 2 wherein the cooling members are installed slanted upwardly from a bath of molten material being treated.

8. An arrangement for protecting the refractory lining of a furnace operating at high temperatures, said lining having an inner face subjected to said high temperatures, comprising solid cooling members of high thermal conductivity embedded in the lining, the outer portions of the cooling members being located outside of the refractory lining, said cooling members being substantially devoid of any water cooling channels in the portions thereof located inside the lining of the furnace, and the length, cross-sectional area, spacing and material of said cooling members being selected to avoid melting thereof and to result in withdrawal of sufficient heat from the furnace lining to limit erosion of the lining.

9. An arrangement as claimed in claim 8 in which the solid cooling members are installed in the sidewall lining of a furnace near or below the surface of a bath of molten process material.

10. An arrangement as claimed in claim 8 wherein the cooling members are a material selected from the group consisting of copper, graphite, iron, stainless steel, molybdenum, titanium and aluminum and combinations thereof.

11. An arrangement as claimed in claim 8 wherein the cooling members are high purity copper.

12. An arrangement as defined in claim 8 wherein cooling members are installed in the sidewalls of an electric furnace.

13. An arrangement as defined in claim 9 wherein the ends of the cooling members outside of the refractory lining have water cooling passages therein.

14. An arrangement as defined in claim 9 wherein the cooling members have finned surfaces integral with their outside ends.

15. An arrangement as defined in claim 8 wherein the cooling members are installed in an electric arc furnace at the arc flare zones of the furnace walls.

16. An arrangement as claimed in claim 9 wherein the cooling members are installed slanted upwardly from a bath of molten material being treated.

17. An arrangement as claimed in claim 8 wherein cooling members are installed in the roof of the furnace.

18. An arrangement as claimed in claim 8 wherein cooling members are installed around tapholes in the furnace.

19. An arrangement as claimed in claim 8 wherein cooling members are installed around gas off-takes and feed ports on the furnace.

* * * * *